`US011376685B2`

United States Patent
Bhakuni et al.

(10) Patent No.: US 11,376,685 B2
(45) Date of Patent: Jul. 5, 2022

(54) AUTOMATIC TIP CHANGER FOR BURNBACK IN AN ARC WELDING ROBOT

(71) Applicant: DEERE & COMPANY, Moline, IL (US)

(72) Inventors: Anil Bhakuni, Pune (IN); Mahmed Yasir Shaikh, Pune (IN); Pankaj Bhorge, Pune (IN); Sarang Misal, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/010,992

(22) Filed: Sep. 3, 2020

(65) Prior Publication Data

US 2020/0398365 A1 Dec. 24, 2020

Related U.S. Application Data

(62) Division of application No. 16/141,481, filed on Sep. 25, 2018, now Pat. No. 10,814,420.

(51) Int. Cl.
*B23K 9/26* (2006.01)
*B23P 21/00* (2006.01)

(52) U.S. Cl.
CPC .............. *B23K 9/26* (2013.01); *B23P 21/004* (2013.01)

(58) Field of Classification Search
CPC ........ B23K 11/314; B23K 37/00; B23K 9/26; B23P 19/00; B23P 21/004
See application file for complete search history.

(56) References Cited

U.S. PATENT DOCUMENTS

| 4,409,464 A | 10/1983 | Favareto et al. |
| 4,763,401 A | 8/1988 | Marinoni et al. |
| 8,950,047 B2 * | 2/2015 | Izutani ................. B25J 15/0491 483/902 |
| 2013/0008003 A1 * | 1/2013 | Izutani ................. B25J 15/0416 29/700 |
| 2015/0298239 A1 * | 10/2015 | Song .................. B23K 11/3072 29/762 |
| 2017/0032281 A1 * | 2/2017 | Hsu .......................... H04L 67/10 |
| 2019/0299321 A1 * | 10/2019 | Kteily .................... B23K 9/328 |

FOREIGN PATENT DOCUMENTS

WO        2017197529 A1    11/2017

* cited by examiner

*Primary Examiner* — Lawrence Averick
(74) *Attorney, Agent, or Firm* — Taft Stettinius & Hollister LLP; Stephen F. Rost (57) ABSTRACT

A fixture for automatically replacing a defective/burnback contact tip coupled to a torch arm of a robotic welder wherein the robotic welder is configured to feed a welding wire to the contact tip. The robotic welder includes a nozzle coupled to the torch arm which is disposed at the contact tip. The fixture includes a first station configured to remove the nozzle from the torch arm and to hold the nozzle for reattachment to the torch arm. A second station is configured to remove the contact tip from the torch arm. A third station includes a plurality of holding units each being configured to hold an unused contact tip, wherein the third station is configured to move one of the plurality of holding units to a predetermined location to locate the unused contact tip for attachment to the torch arm.

12 Claims, 10 Drawing Sheets

AUTOMATIC TIP CHANGER FOR BURNBACK IN AN ARC WELDING ROBOT

RELATED APPLICATION

This application is a divisional application of U.S. patent application Ser. No. 16/141,481, filed Sep. 25, 2018, having the title "Automatic Tip Changer for Burnback in an Arc Welding Robot" the disclosure of which is hereby incorporated by reference in its entirety.

FIELD OF THE DISCLOSURE

The present disclosure relates to an arc welding robot, and more particularly, to a welding tip changing apparatus to replace a used or defective/burnback welding tip.

BACKGROUND

Welding robots automate welding operations and are used in a wide variety of industries, typically requiring high volume production and repetitive welding. Robotic welders are often used in original equipment manufacturing industries such as automotive, agricultural, transportation, and construction vehicle industries. Industries other than vehicle manufacturing industries also employ welding robots to manufacture other types of products of varying sizes and shapes. One such industry is the agricultural equipment industry that manufactures apparatus for soil cultivation, planting crops, fertilization, pest control, and irrigation.

In each of these industries, robotic welding typically includes holding one or more parts, then welding those parts together to form a permanent bond. The welding process employed by a robotic welder includes arc welding, resistance welding, spot welding, TIG welding, MIG welding, laser welding, and plasma welding. In many industrial applications, a number of robotic work stations are arranged along a path taken by the apparatus being made, where each station is dedicated to perform a particular repetitive operation. Once the operation is completed at one of the work stations, the apparatus moves to another work station where additional welding operations are performed by another robotic welder.

The robotic welder is located in a work cell which is intended to prevent an individual from entering a work area where the welder performs its operations. In one type of welder, a robotic arm moves within the work area to apply welds to different locations on the structure being welded. The robotic arm includes a welding tip which guides the weld wire to the material begin mated together. Due to the repetitive nature of the welding, the welding tip must be replaced on a relatively regular basis to insure complete welding of the parts. In some cases, the welding tip must be replaced due to a weld forming at the contact tip, known as burnback, which prevents a proper weld from forming.

Replacement of a welding tip requires that a repair person step inside the work cell to remove the contact tip from the robotic arm. The tip removal process, if not done with caution, can expose the repair person to risks that should be avoided. In addition, the tip changing activity consumes a significant amount of non-value added labor time to change the tips, which in turn affects the productivity of the entire manufacturing operation. In addition, this tip changing process can disturb the settings or angle of the robotic welder, which then requires a re-calibration of the welding torch, another delay that affects the productivity of the manufacturing operation. What is needed, therefore, in an apparatus and method to replace a used or defective/burnback welding tip automatically without the need for intervention by a repair person.

SUMMARY

In one embodiment of the present disclosure there is provided a method of replacing a contact tip of a welding torch arm in a robotic welder wherein the robotic welder is configured to feed a welding wire to the contact tip and the welding torch arm has a nozzle disposed at the contact tip. The method includes: removing the nozzle from the arm to expose the contact tip; clamping the contact tip at a first location; releasing the clamped contact tip from being clamped; identifying whether the contact tip is located at the first location after being released; moving the welding wire until the contact tip is located at a second location if the contact tip was identified as being located at the first location after being released; and cutting the welding wire to separate the contact tip from the welding wire.

In a first example of this embodiment, the method includes rotating the clamped contact tip while at the first location to separate the contact tip from the welding torch arm. In a second example, the method includes coupling an unused contact tip to the welding torch arm. In a third example, the method includes coupling the nozzle to the welding torch arm after coupling the unused contact tip to the welding torch arm. In a fourth example, the method includes providing a plurality of contact tip holding units, each contact tip holding unit configured to hold one of a plurality of unused contact tips.

In a fifth example, the method includes moving at least one of the plurality of contact tip holding units to position one of the plurality of unused contact tips to be coupled to the welding torch arm. In a sixth example, the method includes rotating the plurality of contact tip holding units about a rotational axis to locate one of the contact tip holding units at a predetermined location for connection of one of the plurality of contact tips to the welding torch arm. In a seventh example, the method includes longitudinally moving the contact tip holding unit along a longitudinal axis inclined with respect to the rotational axis to engage the unused contact tip to the welding torch arm.

In another embodiment, there is provided a fixture for replacing a contact tip coupled to a torch arm of a robotic welder configured to feed a welding wire to the contact tip, wherein a nozzle is coupled to the torch arm and is disposed at the contact tip. The fixture includes a first station configured to remove the nozzle from the torch arm and to hold the nozzle for reattachment to the torch arm. A second station is configured to remove the contact tip from the torch arm. A third station includes a plurality of holding units with each being configured to hold an unused contact tip. The third station is configured to move one of the plurality of holding units to a predetermined location to locate the unused contact tip for attachment to the torch arm.

In a first example of this embodiment, the second station includes a holding chuck and a first sensor directed toward the holding chuck, wherein the holding chuck includes a first position to hold the contact tip and a second position to release the contact tip from the first position. In a second example, the second station includes a drive operatively connected to the holding chuck to move the holding chuck about a rotational axis to remove the contact tip from the arm. In a third example, the second station includes a second sensor configured to determine a position of the of the contact tip at a location displaced from the location of the holding chuck. In a fourth example, the second station includes a cutter configured to separate the wire from the contact tip.

In a fifth example, the second station includes a second sensor directed toward a path of the contact tip when separated from the welding wire, wherein the second sensor transmits a signal indicating that the separation of the contact tip from the welding wire. In a sixth example, the third station includes an aperture, a holding unit platform, and a platform mover operatively connected to the holding unit platform, wherein the plurality of holding units are supported by the holding unit platform and the platform mover is configured to sequentially position each one of the plurality of holding units at the aperture. In a sixth example, the third station includes a tip driver including a motor and a shaft coupled to the motor, wherein the tip driver is disposed adjacent to the holding unit platform and the shaft includes a contact feature, wherein the contact feature is configured to engage a corresponding feature on the holding unit to move the holding unit and the tip for coupling the tip to the torch arm. In a seventh example, a biasing mechanism is operatively connected to the holding unit, wherein the biasing mechanism is configured to oppose a pressure applied to the contact tip received from the torch arm.

In a further embodiment, a robotic welding system including a robotic arm, a welding torch arm coupled to the robotic arm, a contact tip coupled to the welding torch, a wire feeder configured to supply a welding wire to the contact tip, and a nozzle disposed at the contact tip. The system includes a fixture for replacing the defective/burnback contact tip including a first station configured to remove the nozzle from the torch arm and to hold the nozzle for reattachment to the torch arm, a second station configured to remove the contact tip from the welding torch arm, and a third station including holding units to hold an unused contact tip. The third station is configured to move the holding units to a predetermined location to locate the unused contact tip for attachment to the torch arm. A controller is operatively connected to the robotic arm and to the fixture. The controller includes a processor and a memory configured to store program instructions. The processor is configured to execute the stored program instructions to: remove the nozzle from the arm to expose the contact tip; clamp the contact tip at a first location; release the clamped contact tip from being clamped; identify whether the contact tip is located at the first location after being released; move the welding wire until the contact tip is located at a second location if the contact tip was identified as being located at the first location after being released; and cut the welding wire to separate the contact tip from the welding wire by an inline cutter. In first example of this embodiment, the processor is further configured to execute the stored program instructions to rotate the clamped contact tip while at the first location to separate the contact tip from the welding torch arm. In a second example, the processor is further configured to execute the stored program instructions to couple an unused contact tip to the welding torch arm after the contact tip is separated from the welding torch arm.

In an additional embodiment, there is provided a robotic welding system including a robotic arm, a welding torch arm coupled to the robotic arm, a contact tip coupled to the welding torch, a wire feeder configured to supply a welding wire to the contact tip, and a nozzle disposed at the contact tip. The robotic welding system includes a fixture for replacing the contact tip including: i) a first station configured to remove the nozzle from the welding torch arm to expose the contact tip and to hold the nozzle for reattachment to the torch arm; ii) a second station including a clamp to clamp and unclamp the contact tip, and a cutter to separate the contact tip from the welding wire; and iii) a third station including one or more holding units each of which holds an unused contact tip, wherein the third station is configured to move each one of the one or more holding units to a predetermined location to locate the unused contact tip for attachment to the welding torch arm, wherein the system performs the method of claim 1.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
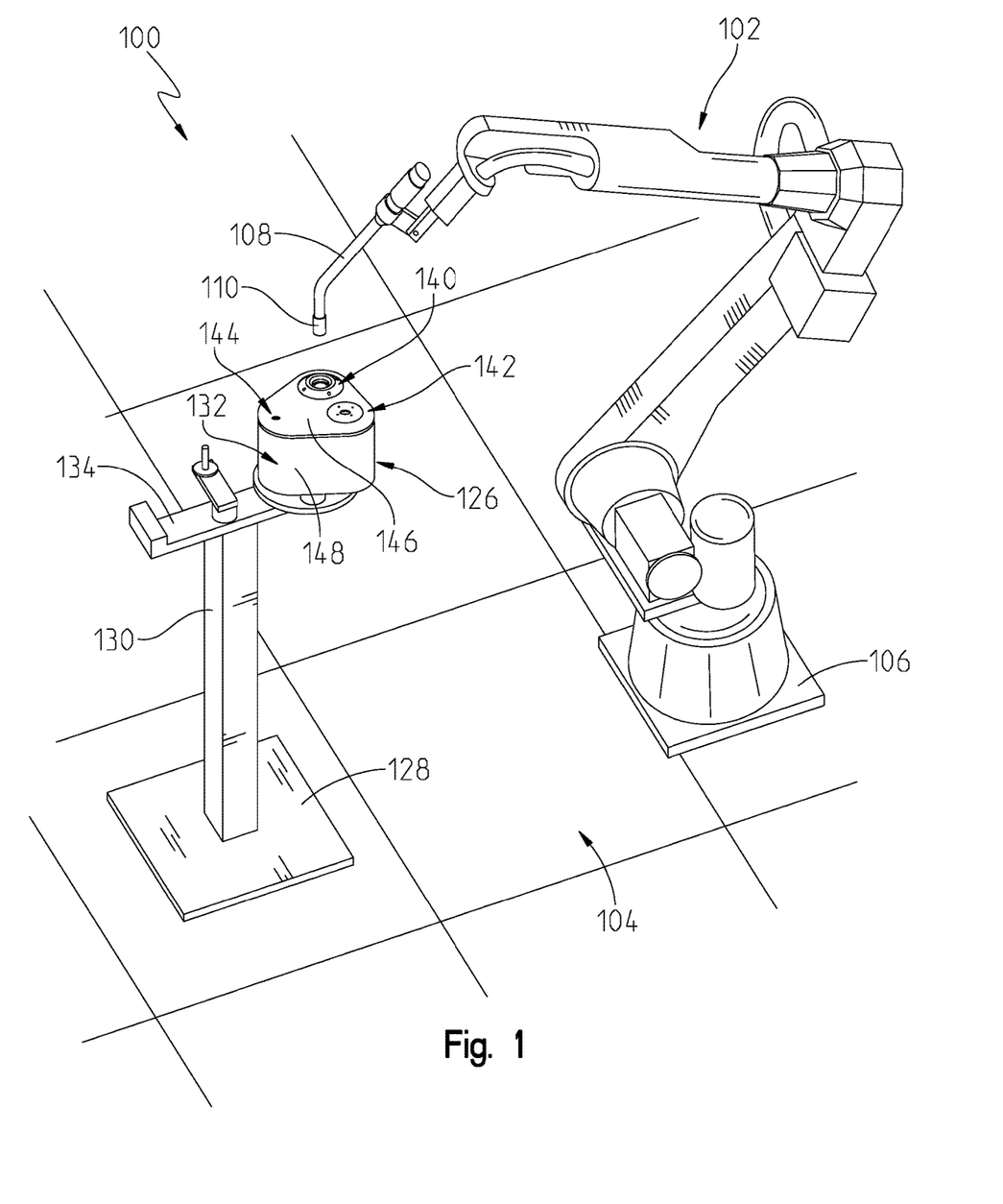
FIG. 1 is an elevational perspective view of a robotic welder and a tip changer apparatus.
Figure 2:
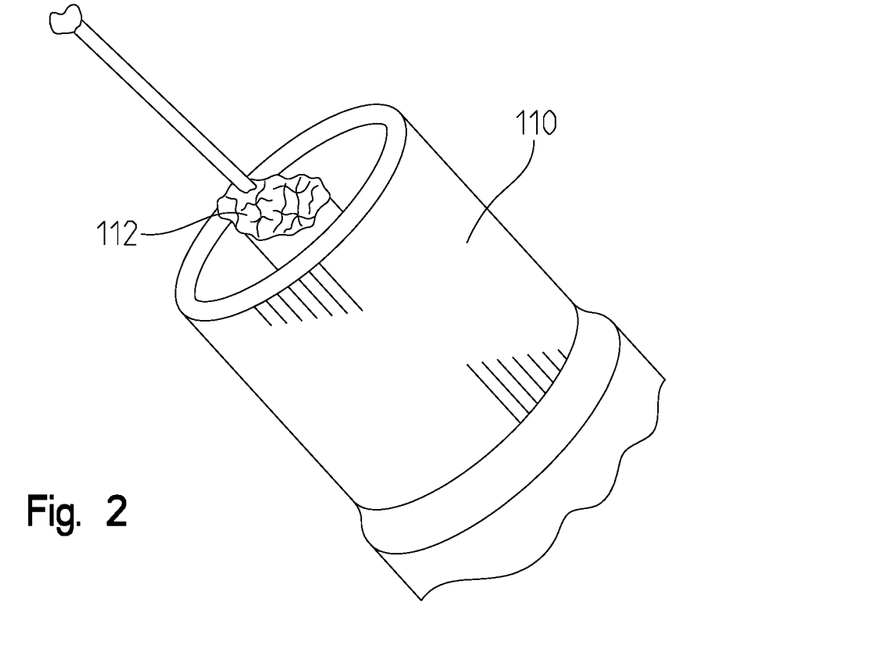
FIG. 2 is a perspective view of a welding tip located within a welding nozzle with burnback.
Figure 3:
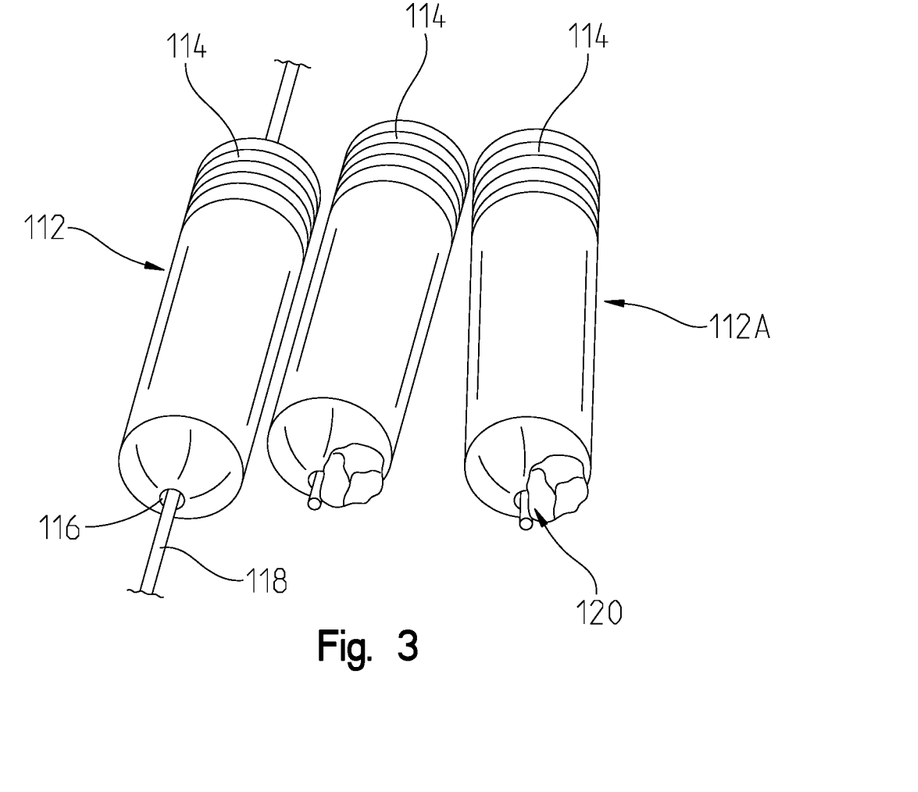
FIG. 3 is perspective view of a plurality of welding tips with burnback.

FIG. 1 illustrates one embodiment of a work cell 100 including a robotic arm 102 fixed to and supported by a surface 104, such as a floor of a manufacturing facility. The robotic arm 102 includes a base 106 coupled to a plurality of articulable links configured to position a welding torch 108 at a variety of locations to weld one part to another part as is understood by one skilled in the art. The welding torch 108, in one embodiment, is an arc welding torch and includes a gas cup or nozzle 110 surrounding a tip 112, as illustrated in FIG. 2. The nozzle 110 includes a plurality of threads, not shown, which are configured to engage threads of the welding torch 108 as is understood by one skilled in the art. The tip 112, three of which are shown in FIG. 3 include threads 114 which are configured to engage threads of the welding torch as is understood by one skilled in the art.

The tip 112 includes an aperture 116 at an end thereof through which a wire 118 is fed by the robotic arm 102. During the welding process, the wire 118 is continuously fed though the tip 112 to form a weld on the material being welded. As seen in FIG. 3, however, the wire 118 of tip 112A cannot be fed through the aperture of the tip 112A, since the wire 118 has formed a weld 120 with the tip 112A. The weld 120, known as burnback, prevents the wire 118 from being fed through the tip 112 during a welding process and therefore requires replacement with an unused, usually new, tip.

The wire 118, which is fed by a wire feeder device 122 (See FIG. 11) such as a motor, is located at or near the robotic arm 102. Once the weld 120 forms at the tip 112A, the wire 118 can no longer be fed through the aperture 116 of the tip. The motor senses the lack of movement of the wire, for instance by a change in current being supplied by a power supply (not shown) coupled to the motor. Once the change in current is detected by the wire feeder device 122, the wire feeder 122 is turned off so that the motor no longer attempts to deliver wire through the nozzle. In one embodiment, the wire feeder 122 includes a sensor to determine current being consumed by the motor.

Once the change in current being consumed by the motor is determined, a controller 124 (See FIG. 11), which is operatively coupled to the wire feeder 122 and to the robotic arm 102, starts a process to automatically remove and replace the burnback tip 112A with a new or unused tip at the welding torch 108. In other embodiments, tips 112 are replaced even though burnback has not occurred.

To replace the tip, the welding torch 108 is moved to a tip changer apparatus 126, which is located near the robotic arm 102. The tip changer apparatus 126 includes a base 128 located on the surface 104. An upright column 130 is coupled to the base 128 and supports a tip changer unit 132 supported by a platform 134 coupled to the column 130. The tip changer unit 132 includes one or more stations which are configured to remove the gas cup 110, remove the nozzle 112, and attach a new or unused nozzle.

The tip changer unit 132 includes a nozzle station 140, a tip removal station 142, and a tip attachment station 144. The nozzle station 140 is configured to remove the nozzle 110 from the welding torch 108 as well as to reattach the same removed nozzle 110 once the tip has been removed and replaced. The tip removal station 142 is configured to remove the defective tip, while the tip attachment station 144 attaches a new or unused tip to the welding torch 108. The tip changer unit 132 includes a top plate 146 coupled to a housing 148 which encloses the nozzle station 140, the tip removal station 142, and the tip attachment station 144 as a single unit. In other embodiments, one or more of the stations 140, 142, and 144 are located separately in one or more different housings or locations.

Figure 4:
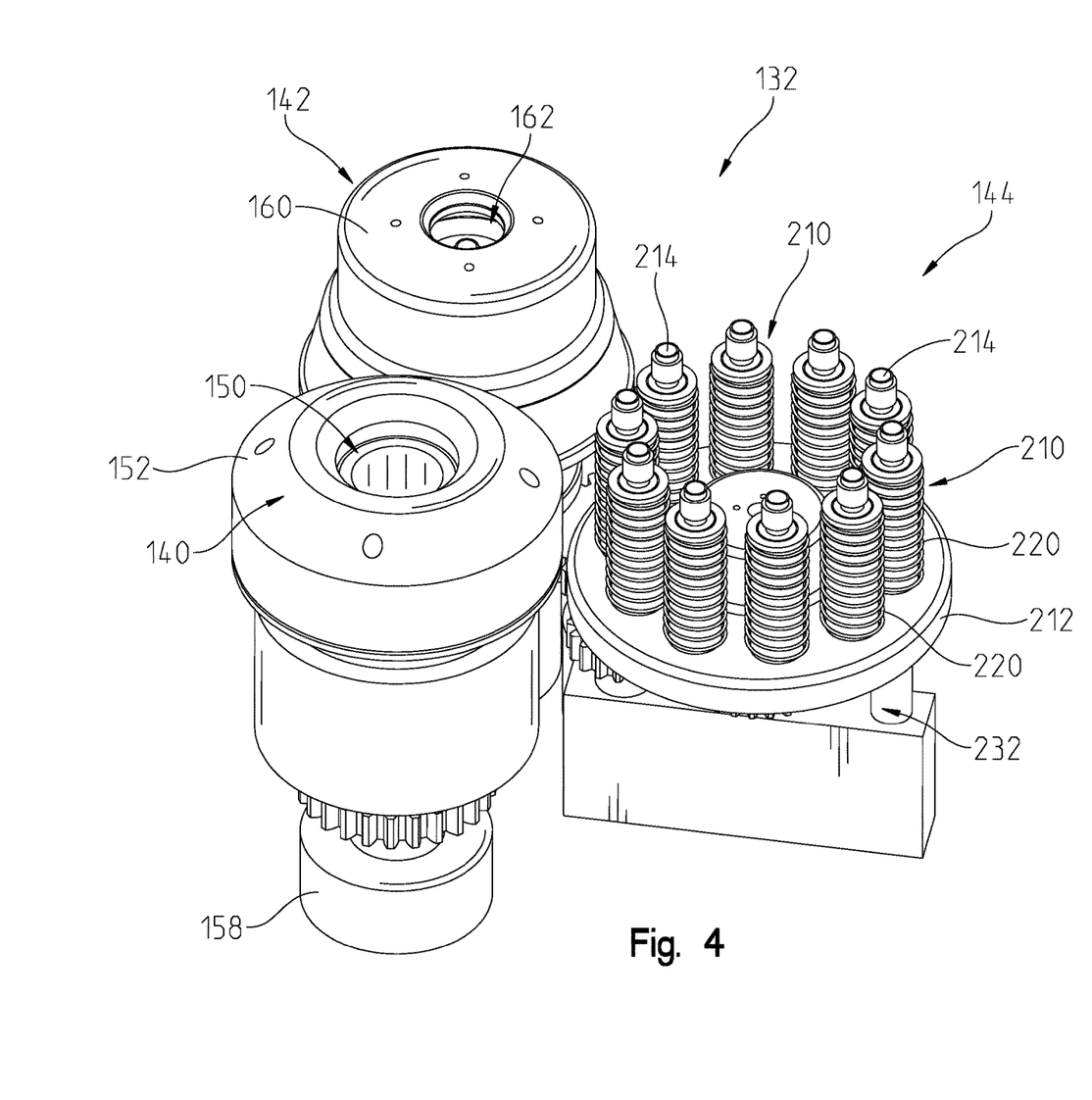
FIG. 4 is a perspective view of a nozzle station, a tip removal station, and a tip attachment station.
Figure 5:
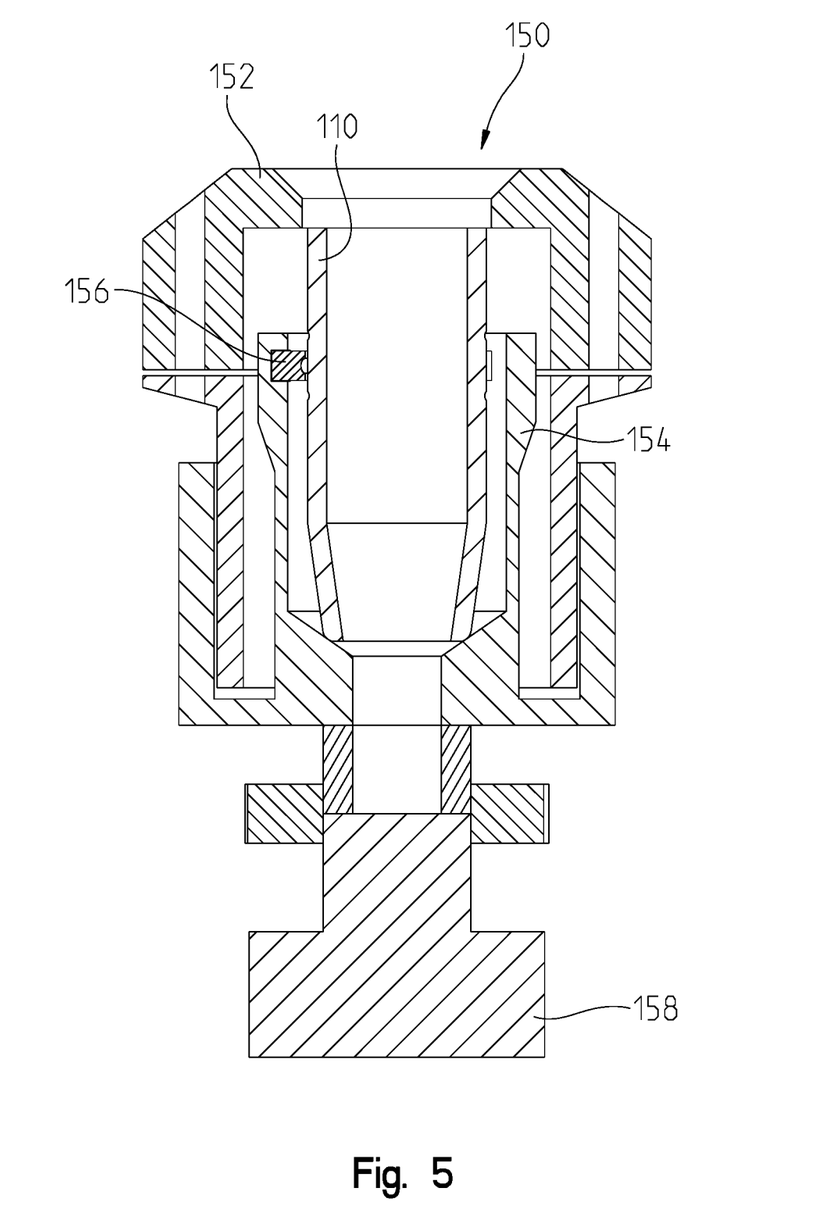
FIG. 5 is a sectional view of a nozzle station.

FIG. 4 illustrates a top perspective view of the tip changer unit 132 without the top plate 146 and the housing 148. As seen in FIG. 4, the nozzle station 140 includes an aperture 150 formed in a cover 152, wherein the aperture 150 includes a size sufficient to receive the nozzle 110. The robotic arm 102, at the direction of the controller 124, aligns the nozzle 110 with the aperture 150 and inserts the nozzle 110 into a holding unit 154 (see FIG. 5), which includes a collet chuck 156 configured to hold the nozzle 110 at a fixed position within the holding unit 154. The robotic arm 102 moves the nozzle 110 forwardly into the holding unit to engage the collet chuck 156. In one embodiment, the forward drive is pulsed for 3 seconds to insure holding of the nozzle 110 within the holding unit 154. Once the nozzle 110 is sufficiently received in the holding unit 154, a motor 158 rotates the holding unit 154 and consequently the nozzle 110 to remove the nozzle 110 from the welding torch 108. Once the nozzle 110 is completely removed from the torch 108, the torch is moved to the tip removal station 142. The nozzle 110 remains in the holding unit 154 for later reattachment to the torch 108 after the tip 112 is removed and replaced.

In FIG. 4 the tip removal station 142 includes a cover 160 defining an aperture 162 including a size sufficient to receive the tip 112. Upon removal of the nozzle 110, the controller 124 moves the torch 108 to the aperture 162 where the tip 112 is inserted for removal of the tip.

Figure 6:
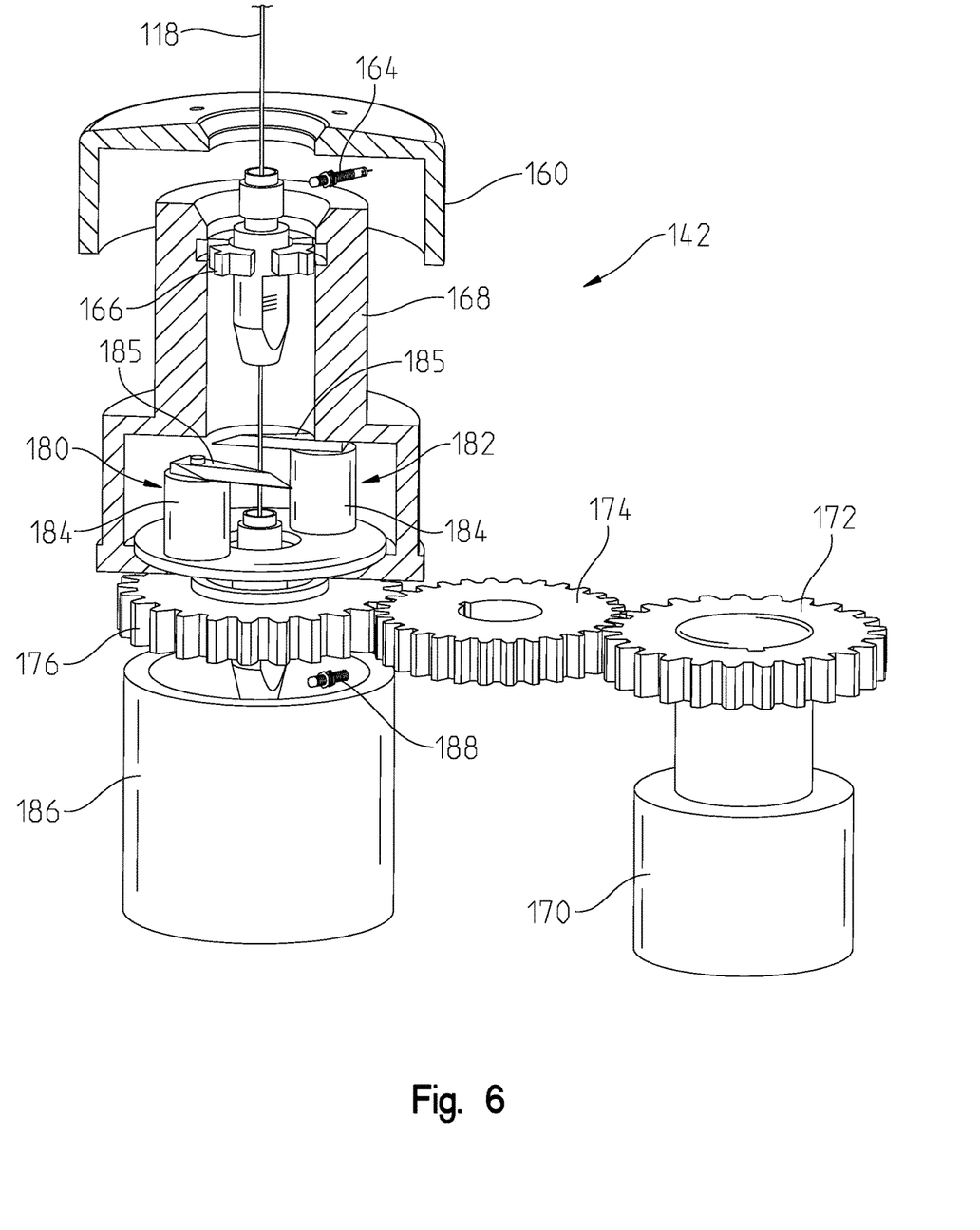
FIG. 6 a perspective view of a tip removal station.

As illustrated in FIG. 6, the tip removal station 142 includes a first proximity sensor 164, which is fixedly located within the cap 160 and which is electrically connected to the controller 124. A holding chuck 166 is supported within a housing 168 which is configured to hold the tip 112 at the location illustrated in FIG. 6. The tip removal station 142 further includes a motor drive 170 which is operatively coupled to housing 168 by a plurality of gears 172, 174, and 176. The gear 176 is fixedly coupled to the housing 168, which when driven by the motor 170, removes the nozzle 112 from the torch 108.

A first cutting actuator 180 and a second cutting actuator 182 are fixedly coupled to the housing 168 to provide a cutter for separating the wire 118 from the tip. Each of the actuators 180 and 182 include a cutting motor 184 attached to and configured to drive a cutting blade 185. The motors 184 are operatively connected to the controller 124. A receptacle 186 is disposed below the holding location of the tip to receive tips that are cut from the wire 118. A second sensor 188 is located at the receptacle 186 to detect when a tip has been released into the receptacle 186. The second sensor 188 is electrically coupled to the controller 124. In other embodiments, one cutting actuator or three or more cutting actuators are contemplated. In addition, while cutting blades are described, other mechanisms for separating the wire from the tip are contemplated.

Figure 7:
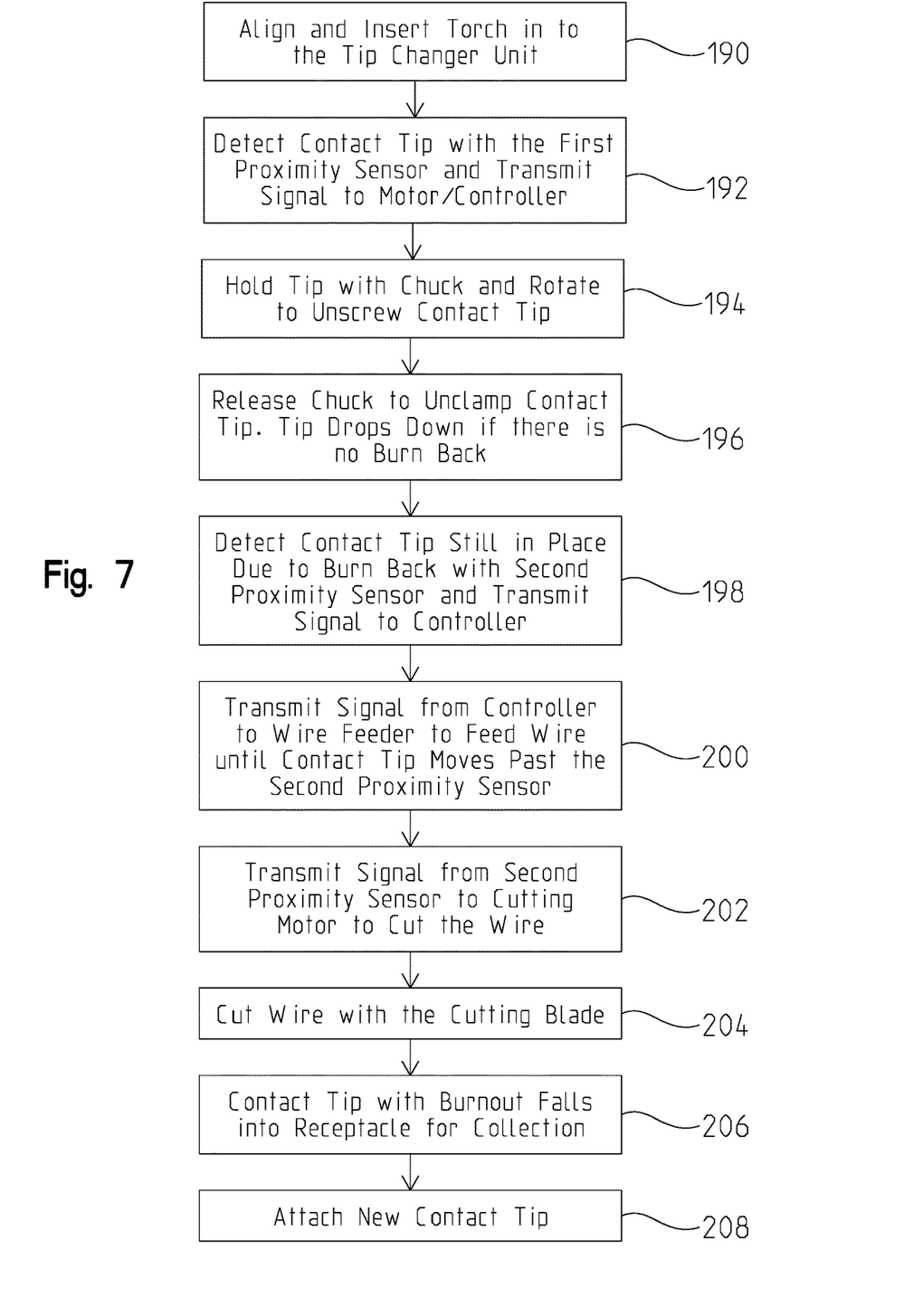
FIG. 7 is a block diagram of a process to remove a tip from a robotic torch arm.

FIG. 7 illustrates a block diagram of a process to remove a tip from the welding torch 108. The torch 108 is aligned and inserted into the tip removal station 142 at block 190. The location of the tip is determined at block 192 with the first proximity sensor 164 and when located at the chuck 166, the first proximity sensor 164 transmits a signal to the controller 124 to stop movement of the welding torch 108 at block 192. At this time, the controller 124 directs chuck 166 to clamp the tip and once clamped, directs the motor 170 to rotate the housing 168 to loosen the tip 112 from the torch 108 at block 194. Once loosened, the chuck releases the tip at block 196. If there is no burnback on the tip or other obstruction, the tip falls along the wire 118 into to the receptacle 186. If the tip however does include burnback, the rotation of the tip rotates the wire 118 as well. The wire 118, however, is a high tensile strength wire and its length to the roll of wire located at the wire feeder 122 is sufficiently long which prevents the wire from being damaged as the tip is rotated.

The sensor 164 determines whether the tip is still located at the opened chuck 166 from being held at the location by burnback. The first proximity sensor 164 transmits a signal to the controller 124 at block 198, and in response, the controller transmits a signal to the wire feeder to feed the wire until the tip moves to or past the second proximity sensor 188 at block 200. Upon determining the location of the tip with the second proximity sensor 188, a signal is transmitted from the second proximity sensor 164 to the cutting motors 184 at block 202. At block 204, the wire 118 is cut. Once the wire is cut, the contact tip with burnout falls into the receptacle 186 for collection at block 206. At this time, a new contact tip is attached to the torch 108 at block 208.

Figure 8:
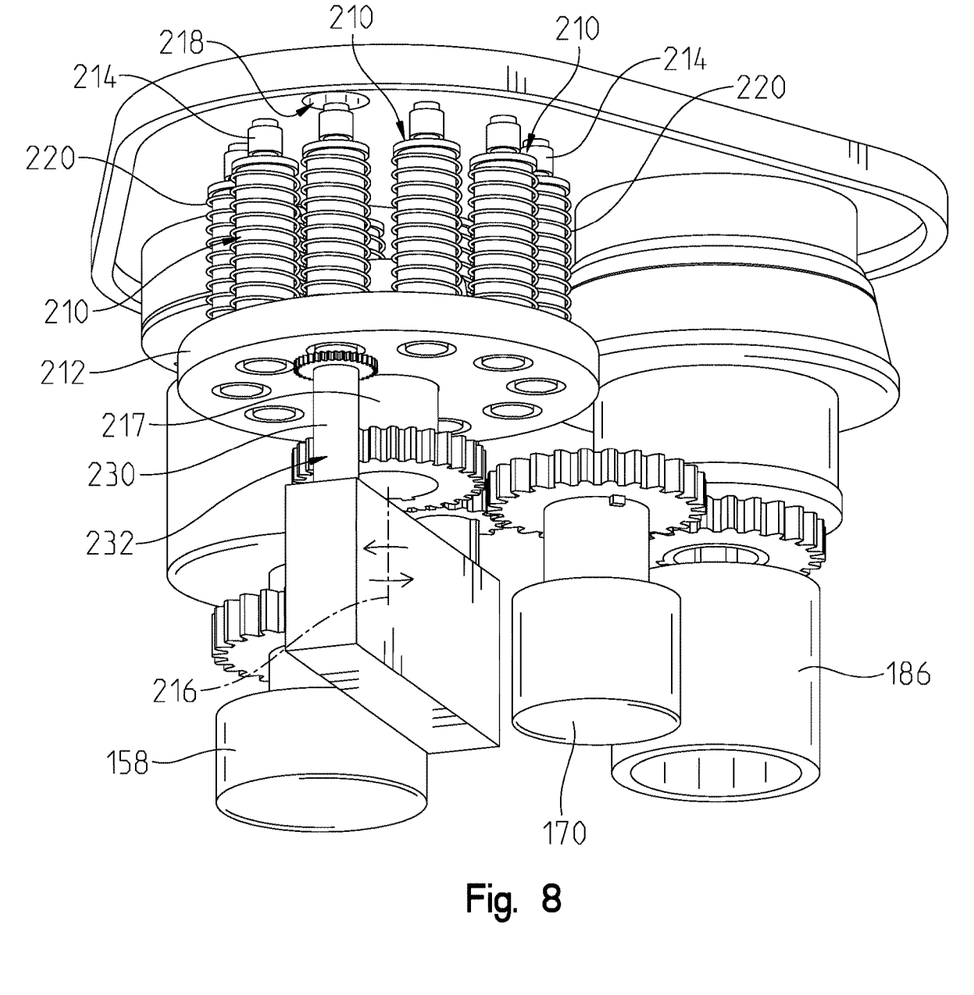
FIG. 8 is an underneath perspective view of a nozzle station, a tip removal station, and a tip attachment station.
Figure 9:
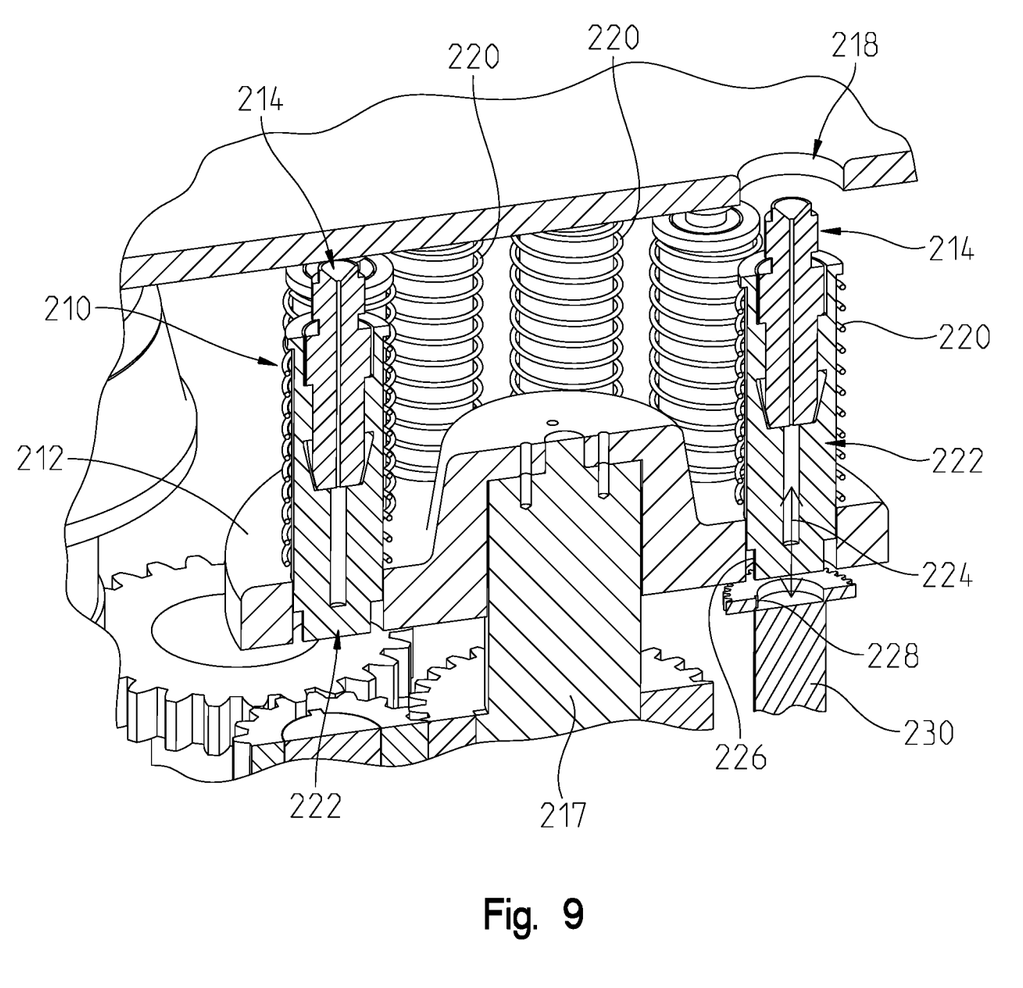
FIG. 9 is a partial perspective sectional view of a tip attachment station.

The tip attachment station 142 is illustrated in the top perspective view of FIG. 4, the bottom perspective view of FIG. 8, and the partial top perspective view of FIG. 9. The station 144 includes a plurality of contact tip holding units 210 each of which is located on and supported by platform, which in the illustrated embodiment is a rotary disc 212. Each of the tip holding units 210 is configured to hold a new or unused tip 214. The rotary disc 212 is moved about a rotational axis 216 by the motor 170 which is coupled to the rotary disc by one or more gears and a shaft 217. The motor 170 sequentially positions each of the holding units at an aperture 218. As the rotary disc 212 moves about the axis, each of the tip holding units 210 moves to the aperture 218 which locates the tip 214 beneath the aperture 218 for access by the welding torch 208.

Each of the holding units 210 includes a spring 220 surrounding a mounting fixture 222 (see FIG. 9), which is resiliently supported by the spring 220, such that the fixture 222 moves along an axis 224 in response to a pressure applied to the tip 214. While a spring 220 is disclosed in the illustrated embodiment, other mechanisms to resiliently bias the mounting fixture are contemplated. As the fixture moves in a downward direction, as illustrated, a key 226 of the fixture 222 engages a slot 228. The slot 228, or contact feature, is located at a shaft 230 of a tip drive motor 232. The shaft 230 of the tip drive motor 232 rotates about a longitudinal axis thereof to thread the new tip 214 into the torch 108.

Figure 10:
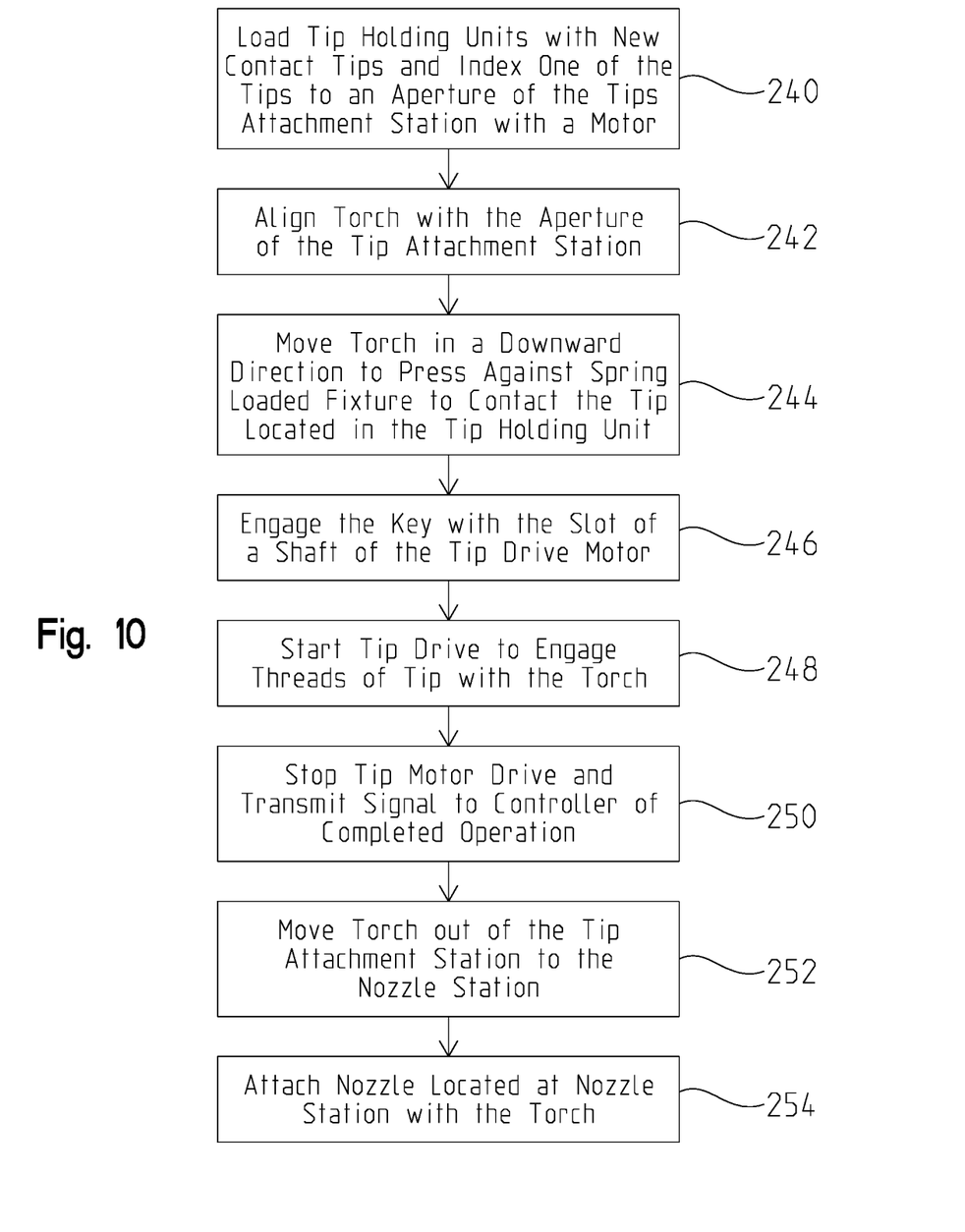
FIG. 10 is a block diagram of a process to attach a tip to a robotic torch arm.

FIG. 10 illustrates a block diagram of a process to attach a new or unused tip to the torch 108 after the nozzle 110 and the used tip have been removed from the torch. Initially at block 240, each of the holding units 210 is loaded with a new tip and one of the new tips is indexed to the aperture 162 where the indexed tip will be attached to the torch 108. Once loaded, the tip attachment station 144 is ready to attach new tips to the torch 108. To attach a tip to the torch, the torch 108 is aligned with the aperture 218 at block 242. After alignment, the torch is moved into contact with a new tip, in this embodiment in a downward direction, and the torch is pressed against the tip in the spring loaded fixture 210 at block 244. Once pressed down, the motor 170 drives the shaft 230 to engage the slot with the key 226 at block 246. Upon engagement, the motor 226 drives the shaft 230 to engage the threads of the tip with the threads of the torch 108 at block 248. The motor 226 continues to thread the tip to the torch until the tip is fully threaded to the torch. In one embodiment, a predetermined number of rotations determines when the tip is fully threaded. In another embodiment, the current drawn by the motor 226 is monitored by controller 124 and compared to a predetermined threshold. When the current exceeds the threshold, the motor is turned off to stop threading of the tip to the torch at block 250. Once threaded, the torch is moved from the tip attachment station to the nozzle station at block 252. Once located at the nozzle station, the nozzle is reattached to the torch.

To reattach the nozzle 110 to the torch 108, controller 124 directs the robotic arm 102 to move the nozzle to the nozzle station 140. The torch 108 is aligned with and inserted into the aperture 150. As the torch approaches the nozzle 110 located in the nozzle station 140, the collet chuck 156 is closed about the nozzle 110 to fix the location of the nozzle 110 for threading the nozzle to the torch 108. In other embodiments, the collet chuck 156 remains closed for holding the nozzle 110 for later reattachment. Once the nozzle 110 is fully engaged by the collet chuck 156, the motor 158 moves the collet chuck in a direction to thread the nozzle threads to the threads of the torch 108. After the nozzle 110 is fully engaged, the motor 158 is stopped and the collet chuck 156 is released to free the nozzle 110 and the torch 108 for a new welding operation. The robotic arm 102 moves the torch 108 to a "home" location, the location from which a new welding operation is started.

Figure 11:
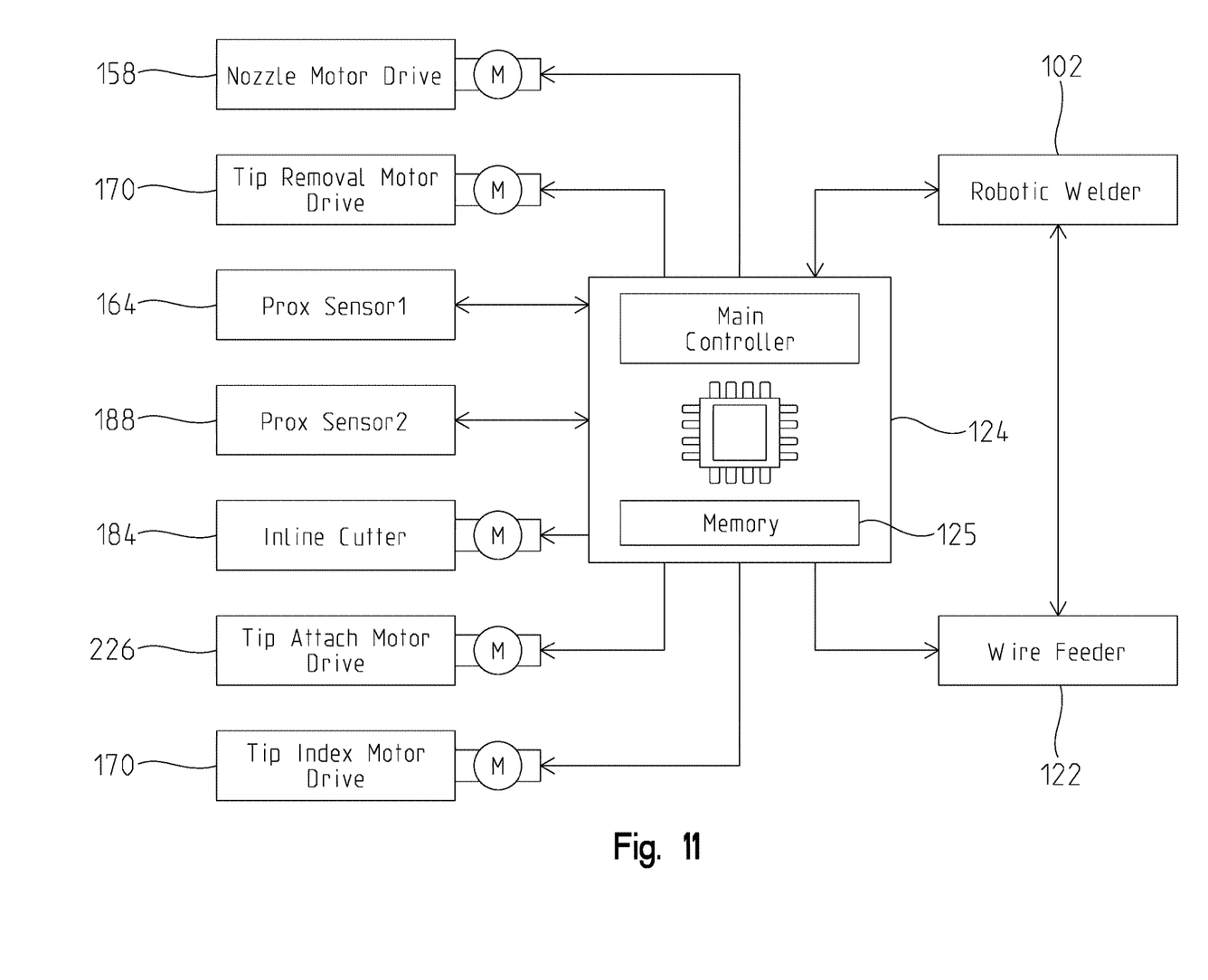
FIG. 11 is a block diagram of an electrical system for a tip changer apparatus.

FIG. 11 illustrates an electrical block diagram 260 including the controller 124, which in one embodiment, is a main controller of the robotic arm 102. The controller 124 includes a memory 125 configured to store program instructions and a processor device of the controller 124 is configured to execute the stored program instructions in response to transmitted signals received form the first proximity sensor 164 and the second proximity sensor 188 as described herein. In addition, the controller 124 is operatively connected to t each of the motors as described herein to remove and attach the nozzle 110 and to remove and attach the welding tips, either new or used, as described herein.

The controller 124, in different embodiments, includes a computer, computer system, or other programmable devices. In other embodiments, the controller 124 includes one or more processors (e.g. microprocessors), and an associated memory, which can be internal to the processor of external to the processor. The memory can include random access memory (RAM) devices comprising the memory storage of the controller 124, as well as any other types of memory, e.g., cache memories, non-volatile or backup memories, programmable memories, or flash memories, and read-only memories. In addition, the memory, in different embodiments, includes a memory storage physically located elsewhere from the processing devices and any cache memory in a processing device, as well as any storage capacity used as a virtual memory, e.g., as stored on a mass storage device or another computer coupled to the controller. The mass storage device can include a cache or other dataspace which can include databases. Memory storage, in other embodiments, is located in the "cloud", where the memory is located at a distant location which provides the stored information wirelessly to the controller 124.

The controller 124 executes or otherwise relies upon computer software applications, components, programs, objects, modules, or data structures, etc. Software routines resident in the included memory of the controller or other memory are executed in response to the signals received. The computer software applications, in other embodiments, are located in the cloud. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user. The controller is configured to execute the stored program instructions.

As described herein, the present disclosure eliminates the manual intervention of operators to change or replace the contact tip from a welding torch, and in particular from an arc welding torch. By automating tip replacement of burned tips, the quality of products is improved by maintaining torch alignment and by reducing the need for calibration which often occurs as a result of manual replacement of the tips. In addition, the present disclosure eliminates the need of an operator to break safety light curtains and step inside a robot cell to change contact tips.

While the replacement of burnback tips is described, the present disclosure is not limited to the replacement of only burnback tips. The replacement of tips having other defects is also contemplated. In addition, the replacement of tips through which the welding wire cannot move, such as an aperture incorrectly sized or the wire having a defect, are also contemplated. In addition, tip replacement can be scheduled on a regular basis even though the tip itself does not suffer from a burnback defect or other defects.

The present disclosure provides a fully automated solution for replacing used tips from tip removal to tip installation. In one or more embodiments, the use of proximity sensors detects for presence and/or location of welding tips, the presence of which is directly accessed through proximity sensors, without the need for additional presence detecting devices. In addition, the tip holding device for providing replacement tips is movable up and down while the other devices and apparatus remain stationary, thus reducing the cost of equipment.

As described herein, the first proximity sensor detects a burnback defect as well as transmits a defect signal to the controller to feed the wire through the tip. Once the burnback defect is detected, the standard operating procedures of the robotic welder are temporarily replaced by the automatic replacement procedures of tips embodied in software programming code. There is also a reduced loss of downtime which can result from a re-calibration of the robotic welder required from a manual replacement of tips. Consequently, production times are improved which reduces manufacturing costs and reduces or eliminates manual intervention, which also reduces costs of compliance with regard to safety procedures and safety reporting.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A robotic welding system including a robotic arm, a welding torch arm coupled to the robotic arm, a nozzle coupled to the welding torch, a wire feeder configured to supply a welding wire to a contact tip disposed at the nozzle, the system comprising:
a fixture for replacing the contact tip including: i) a first station configured to remove the nozzle from the welding torch arm to expose the contact tip and to hold the nozzle for reattachment to the torch arm; ii) a second station including a clamp to clamp and unclamp the contact tip, and a cutter to separate the contact tip from the welding wire; and iii) a third station including one or more holding units each of which holds an unused contact tip, wherein the third station is configured to move each one of the one or more holding units to a predetermined location to locate the unused contact tip for attachment to the welding torch arm, wherein the system performs a method of:
removing the nozzle from the welding torch arm to expose the contact tip;
clamping the contact tip at a first location;
releasing the clamped contact tip from being clamped;
identifying whether the contact tip is located at the first location after being released;
moving the welding wire until the contact tip is located at a second location if the contact tip was identified as being located at the first location after being released; and
cutting the welding wire to separate the contact tip from the welding wire.

2. The robotic welding system of claim 1 further comprising:
a controller operatively connected to the robotic arm and to the fixture, the controller including a processor and a memory configured to store program instructions and the processor is configured to execute the stored program instructions to perform the method of claim 1.

3. The robotic welding system of claim 2 wherein the processor is further configured to execute the stored program instructions to:
rotate the clamped contact tip while at the first location to separate the contact tip from the welding torch arm.

4. The robotic welding system of claim 3 wherein the processor is further configured to execute the stored program instructions to:
couple an unused contact tip to the welding torch arm after the contact tip is separated from the welding torch arm.

5. The robotic welding system of claim 3, the system comprising:
a controller operatively connected to the robotic arm and to the fixture, the controller including a processor and a memory configured to store program instructions and the processor is configured to execute the stored program instructions.

6. The robotic welding system of claim 5 wherein the processor is further configured to execute the stored program instructions to:
rotate the clamped contact tip while at the first location to separate the contact tip from the welding torch arm.

7. The robotic welding system of claim 6 wherein the processor is further configured to execute the stored program instructions to:
couple an unused contact tip to the welding torch arm after the contact tip is separated from the welding torch arm.

8. The robotic welding system of claim 4 wherein the processor is further configured to execute the stored program instructions to:
couple the nozzle to the welding torch arm after coupling the unused contact tip to the welding torch arm.

9. The robotic welding system of claim 8 wherein the processor is further configured to execute the stored program instructions to:
move at least one of the plurality of contact tip holding units to position one of the plurality of unused contact tips to be coupled to the welding torch arm.

10. The robotic welding system of claim 9 wherein the processor is further configured to execute the stored program instructions to:
rotate the plurality of contact tip holding units about a rotational axis to locate one of the contact tip holding units at a predetermined location for connection of one of the plurality of contact tips to the welding torch arm.

11. The robotic welding system of claim 10 wherein the processor is further configured to execute the stored program instructions to:

longitudinally move the contact tip holding unit along a longitudinal axis inclined with respect to the rotational axis to engage the unused contact tip to the welding torch arm.

12. The robotic welding system of claim 11 wherein the processor is further configured to execute the stored program instructions to:
move the welding torch arm to a welding location to start a welding operation.

* * * * *